Sept. 2, 1969          R. L. WEBER          3,464,746

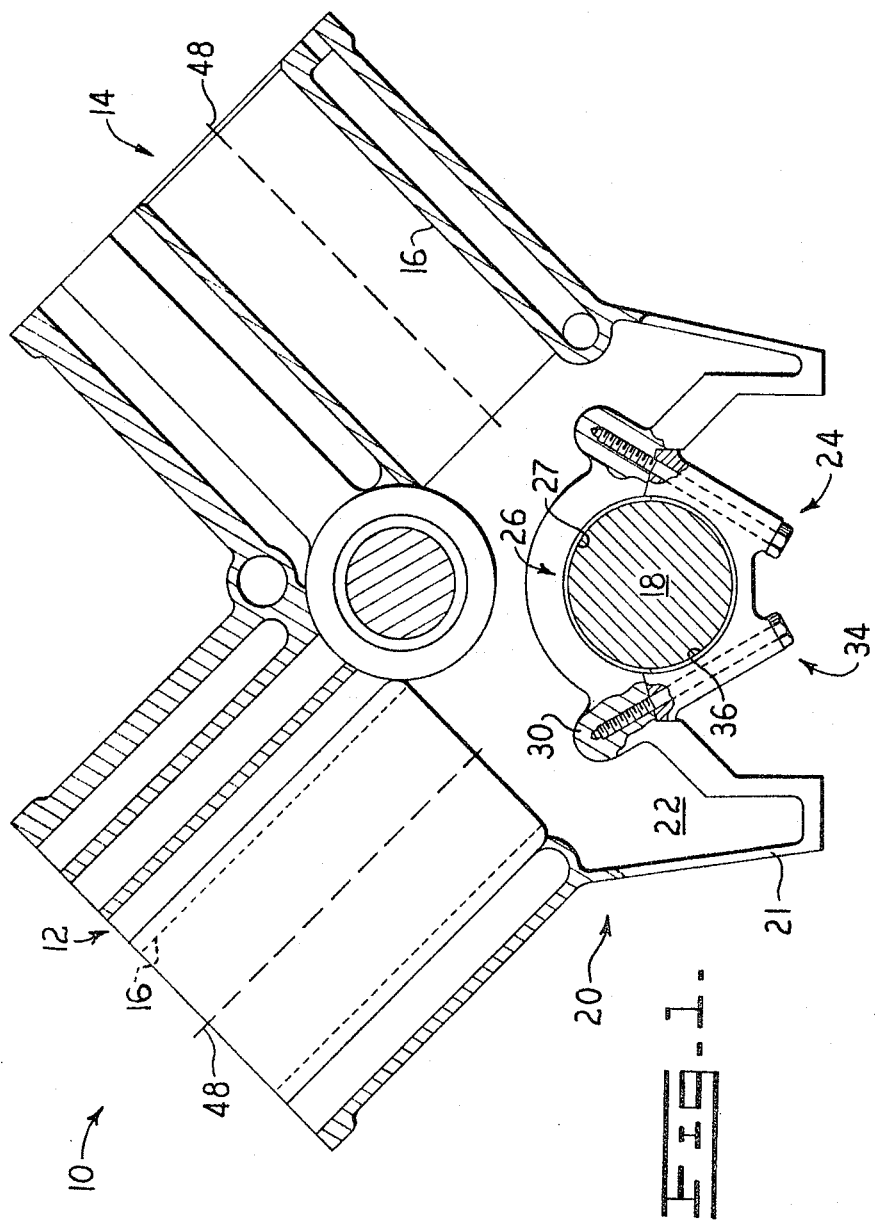
INVENTOR.
ROBERT L. WEBER

CRANKSHAFT MOUNTING ASSEMBLY

Filed June 16, 1967          2 Sheets-Sheet 2

INVENTOR.
ROBERT L. WEBER

BY
Fryer, Tjensvold, Feix, Phillips & Lempio
ATTORNEYS

United States Patent Office 3,464,746
Patented Sept. 2, 1969

3,464,746
CRANKSHAFT MOUNTING ASSEMBLY
Robert L. Weber, Lacon, Ill., assignor to Caterpillar Tractor Co., Peoria, Ill., a corporation of California
Filed June 16, 1967, Ser. No. 646,597
Int. Cl. F16c 9/00, 3/06; F02f 7/00
U.S. Cl. 308—23      3 Claims

ABSTRACT OF THE DISCLOSURE

A mounting assembly for the crankshaft of a V-type engine. The invention provides a bearing saddle and a bearing cap, which cooperate to provide a cylindrical bearing surface for the engine crankshaft. The bearing saddle and bearing cap have respective abutting surfaces of interengagement, and are secured together at such surfaces by two bolts. Each of the bolts extends obliquely with respect to the surfaces of the inter-engagement. Each bolt thus provides a load at such surfaces, which load has both a vertical and a horizontal component of force. The vertical component of force tends to resist separation of the cap from the saddle. The horizontal component of force tends to resist sliding movement of the cap with respect to the saddle.

---

Mounting assemblies for the crankshafts of V-type internal combustion engines usually includes a bearing saddle and a bearing cap, which are secured together by means of bolts. Such bolts have been disposed perpendicularly to the abutting surfaces of the bearing cap and bearing saddle. Each bolt usually lies parallel to the vertical center line of the engine, or parallel to the longitudinal center lines of the cylinders of one of the cylinder banks.

The known crankshaft mounting assemblies have exhibited a serious disadvantage. Because of the angular disposition of the cylinders of a V-type engine, both horizontal and vertical components of force are exerted by the piston rods upon the crankshaft. The horizontal components of force have often caused the bearing caps to slide transversely with respect to the bearing saddles. Such transverse sliding movement has caused unusually high stresses at the abutting surfaces of the cap and saddle. Such stresses have produced fretting, and, ultimately, cracking of the surfaces.

The problem of transverse bearing cap motion has stemmed primarily from the perpendicular disposition of the bolts securing together the bearing cap and bearing saddle. These bolts, while securing together the bearing cap and bearing saddle as against the vertical components of force exerted upon the crankshaft, have not provided sufficient clamping force to prevent the sliding movements caused by the horizontal components of force.

It has been attempted in the prior art to prevent the sliding movements of the bearing cap by increasing the clamping force exerted by the bolts. However, such higher torquing of the bolts had often resulted in bolt failure due to over-stressing when under cyclic loads. Attempts have been made in the prior art to employ larger bolts, so as to avoid the problem of bolt failure. However, the use of such larger bolts requires an increase in the size of the bearing saddle. Larger bolts also serve to cause the cylinder block to be stressed more greatly, and thus necessitate a thicker transverse web and, consequently, a block having increased weight.

Attempts also have been made in the prior art to prevent sliding movement of the bearing cap, through the use of bolts inserted at the sides of the saddle-cap assembly. Such side bolts tend to create a leakage path for lubricating oil and also increase the cost and the weight of the engine.

The present invention provides an improved crankshaft mounting assembly. In accordance with the invention, each bearing saddle and the associated bearing cap are secured together at their surface of inter-engagement by one or more attachment members extending obliquely with respect to such surface. Each attachment member provides a component of force which is perpendicular to the surface of inter-engagement, and which tends to resist separation of the bearing cap from the bearing saddle. Each attachment member, in addition, provides a component of force which is parallel to the surface of inter-engagement. Such latter component of force tends to resist sliding movement of the bearing cap with respect to the bearing saddle. As a consequence, fretting and cracking of the surface of inter-engagement is avoided. At the same time, there is no increase in the weight or the cost of the engine structure.

Other advantages of the present invention will become apparent to one skilled in the art, from the following description, when read in conjunction with the accompanying drawings, in which:

FIG. 1 is a vertical cross-sectional view of a portion of the cylinder block of a V-type engine, which cylinder block incorporates the present invention;

Figure 3:
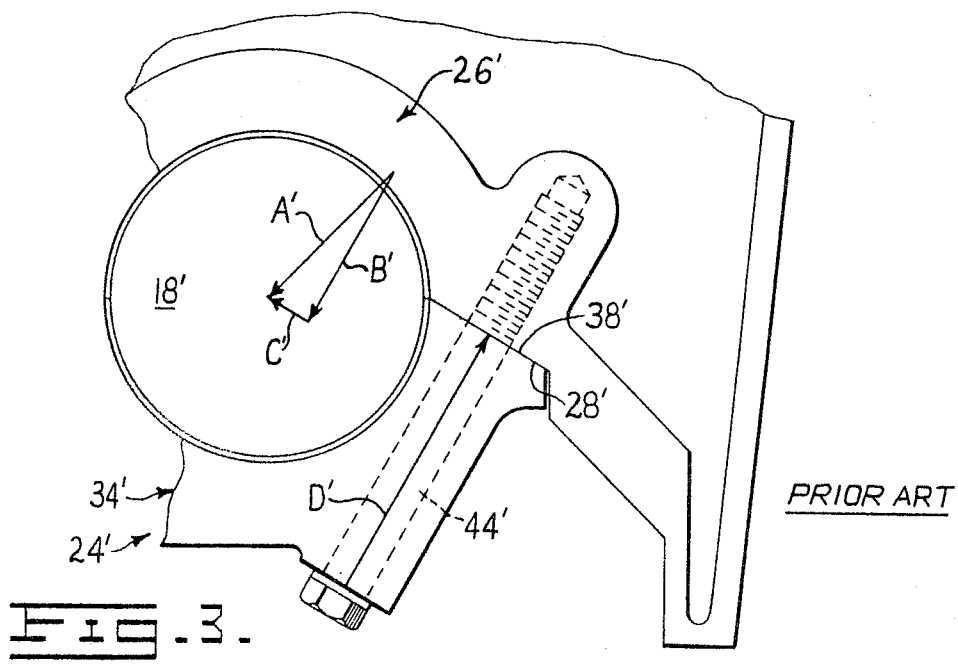
FIG. 3 is a view similar to FIG. 2 but illustrating a crankshaft mounting assembly of the prior art.

In FIG. 1, there is shown the cylinder block 10 of a V-type internal combustion engine. The block 10 provides two angularly-disposed cylinder banks 12 and 14. Each of the banks 12 and 14 is formed with a plurality of longitudinally-spaced-apart cylinder bores 16. Each of the bores 16 receives a reciprocating piston (not shown). The latter is connected to a crankshaft 18 by means of connecting rods (not shown), in conventional manner.

The crankshaft 18 is rotatably supported within a crankcase 20, having sidewalls 21. Integrally cast with the sidewalls 21 are a plurality of longitudinally-spaced and transversely-extending webs 22 (one being shown). Each of the webs 22, at one side thereof, extends intermediate two of the adjacent cylinder bores 16 of the bank 12. At the opposite side thereof, each web 22 similarly extends intermediate two of the adjacent cylinder bores 16 of the bank 14.

Associated with each of the webs 22 is a crankshaft mounting assembly 24, constructed in accordance with the invention. Only one of such assemblies 24 is shown, and will here be described. As part of the assembly 24, the associated web 22 provides a bearing saddle 26 which is formed with a semi-cylindrical bearing surface 27 for the crankshaft 18. Each saddle 26 is also formed with an abutment surface 28 (see also FIG. 2). Each of the saddles 26 is formed with two bosses 30, positioned at the opposite sides, respectively, of the crankshaft 18. Each of the bosses 30 is provided with a threaded bore 32.

The assembly 24 also includes a bearing cap 34. The bearing cap 34 is formed with a semi-cylindrical bearing surface 36 for the crankshaft 18. The bearing cap 34 is also formed with an abutment surface 38. The bearing cap 34 provides at its opposite sides, respectively, two bosses 40. Cut through each boss 40 is a bore 42.

The bearing cap 34 is mounted with the abutment surface 38 thereof in engagement with the abutment surface 28 of the saddle 26. In such position, the bore 42 of the boss 40 registers with the bore 32 of the boss 30. The bearing surfaces 27 and 36 together provide a cylindrical bearing surface for the crankshaft 18.

The saddle 34 is secured in the above-described position, by means of two attachment members, being in the form of bolts 44. Each of the bolts 44 passes through one of the bores 42, and is threadedly connected to the registering bore 32.

The abutting surfaces 28, 38 extend obliquely with respect to the horizontal transverse axis 46 of the crankshaft 18. Each of the bolts 44 is disposed obliquely to the abutting surfaces 28–38 and obliquely with respect to the longitudinal axis 48 of the adjacent cylinder bore 16.

Figure 2:
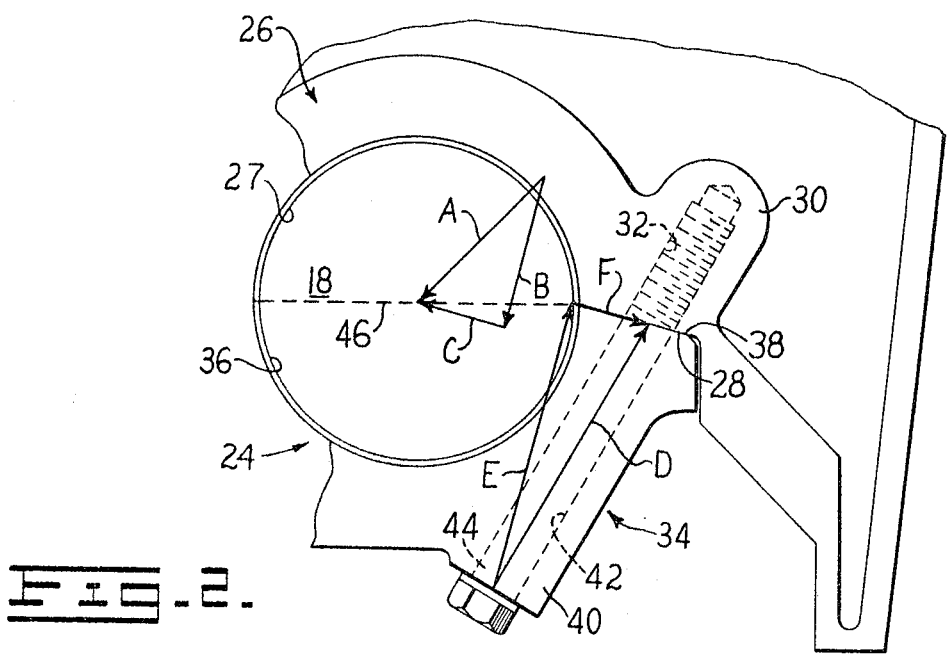
FIG. 2 is an enlarged fragmentary view of part of the structure of FIG. 1.

The operation of the mounting assembly 10 will be described with particular reference to FIG. 2. During the running of the engine with which the assembly 10 is associated, the piston rod within each of the cylinder bores 16 exerts a force upon the crankshaft 18, such as is represented by the vector line A. The force A has a vertical component, such as is represented at B; and a horizontal component, such as is represented at C. The vertical component B tends to separate the cap 34 from the saddle 26. The horizontal component C acts transversely to the abutting surfaces 28, 38, and tends to cause the cap 34 to slide with respect to the saddle 26.

The bolt 44 provides a load D upon the surfaces 28, 38. The extent of the load D is determined by the torque applied to the bolt 44 when the cap 34 is initially installed. The load D has a vertical component E; and a horizontal component F. The vertical component E provides resistance against separation of the cap 34 from the saddle 26. The horizontal component F provides resistance against sliding of the cap 34 with respect to the saddle 26. Such resistance against sliding movement is additional to the frictional resistance present at the surfaces 28, 38. Such frictional resistance is the product of multiplication of the vertical component E and the coefficient of friction at the surfaces 28, 38.

The manner of operation of the assembly 24 is to be contrasted with the manner of operation of the mounting assemblies of the prior art shown at 24' in FIG. 3. Here, a bearing cap 34' is secured to a bearing saddle 26' by means of two bolts 44' (one being seen). Each bolt 44' extends perpendicularly to the abutting surfaces 28', 38'.

In the operation of the mounting assembly 24', a force A' is exerted upon the crankshaft 18'. The force A' has a vertical component B' and a horizontal component C'. The bolt 44' provides a load D' at the surfaces 28', 38'. Since the load D' has a direction perpendicular to the surfaces 28', 38', no horizontal component of force is provided. As a consequence, the resistance to sliding movement is determined solely by the frictional forces at the surfaces 28', 38'. The bolt 44' itself does not serve to prevent such sliding movement.

The bolt 44 thus operates, in contrast to the bolt 44', to provide a load D that serves to resist sliding movement of the cap 34, as well as separation of the latter from the saddle 26. As a consequence, high stresses at the surfaces 28, 38, such as might cause fretting and ultimate cracking, are avoided. As an additional advantage of the assembly 24, overstressing of the block 10, or the bolt 44 is avoided, while a relatively light-weight structure is obtained. At the same time, the necessity of using side bolts is obviated.

I claim:

1. A V-type engine comprising:
   a block having a semi-circular bearing saddle integral therewith,
   a crankshaft disposed for rotation about a longitudinal axis thereof,
   a removable, semi-circular bearing cap having flat surface portions thereof abutting flat surface portions of said bearing saddle on opposite sides of said crankshaft to form first and second pairs of abutting surface portions, each pair of abutting surface portions lying in a flat plane with said planes forming an obtuse angle substantially less than 180° therebetween on the bearing cap side of said crankshaft, and
   fastening means securing said bearing cap to said bearing saddle and positioned on opposite sides of said crankshaft with said fastening means forming an acute angle with respect to each other on the bearing cap side of said crankshaft and each fastening means forming an acute angle with respect to a respective one of said first and second pairs of abutting surface portions for exerting substantial forces thereat which forces are directed radially outwardly relative to said crankshaft and in directions away from each other for counteracting lateral forces imposed on said bearing cap by said crankshaft during operation of said engine.

2. An engine comprising:
   a block having a semi-circular bearing saddle integral therewith,
   a crankshaft disposed for rotation about a longitudinal axis thereof,
   a removable, semi-circular bearing cap juxtaposed to said bearing saddle and cooperating therewith to surround a portion of said crankshaft,
   said bearing cap having first and second surface portions positioned on opposite sides of said crankshaft to abut juxtaposed first and second surface portions, respectively, of said bearing saddle to form a pair of abutting surface portions on opposite sides of said crankshaft,
   each pair of surface portions substantially lying in a plane parallel to the longitudinal axis of said crankshaft,
   said planes intersecting to form an included angle therebetween, defining the semi-circular length of said bearing cap, approximating 150°, and
   first and second threaded securing means positioned on opposite sides of said crankshaft for securing said bearing cap to said bearing saddle and block, each securing means disposed on a longitudinal axis thereof which intersects a respective pair of said abutting surfaces at an angle approximating 75° with the axes of said fastening means forming an included angle therebetween, on the bearing cap side of said crankshaft, approximating 60°.

3. The invention of claim 2 further comprising means integral with said block and juxtaposed to at least a portion of said cap on opposite sides of said crankshaft for aiding in preventing said cap from moving laterally outwardly relative to said crankshaft.

References Cited

UNITED STATES PATENTS

| 1,916,292 | 7/1933 | Woolson | 308—23 X |
| 2,334,916 | 11/1943 | Ford et al. | 308—23 |
| 3,320,940 | 5/1967 | Mitchell et al. | 123—195 |

FOREIGN PATENTS 731,730  6/1955  Great Britain.

CARROLL B. DORITY, JR., Primary Examiner

U.S. Cl. X.R.

123—195